May 18, 1943. W. B. REED 2,319,347
VALVE CONTROL
Filed June 5, 1941
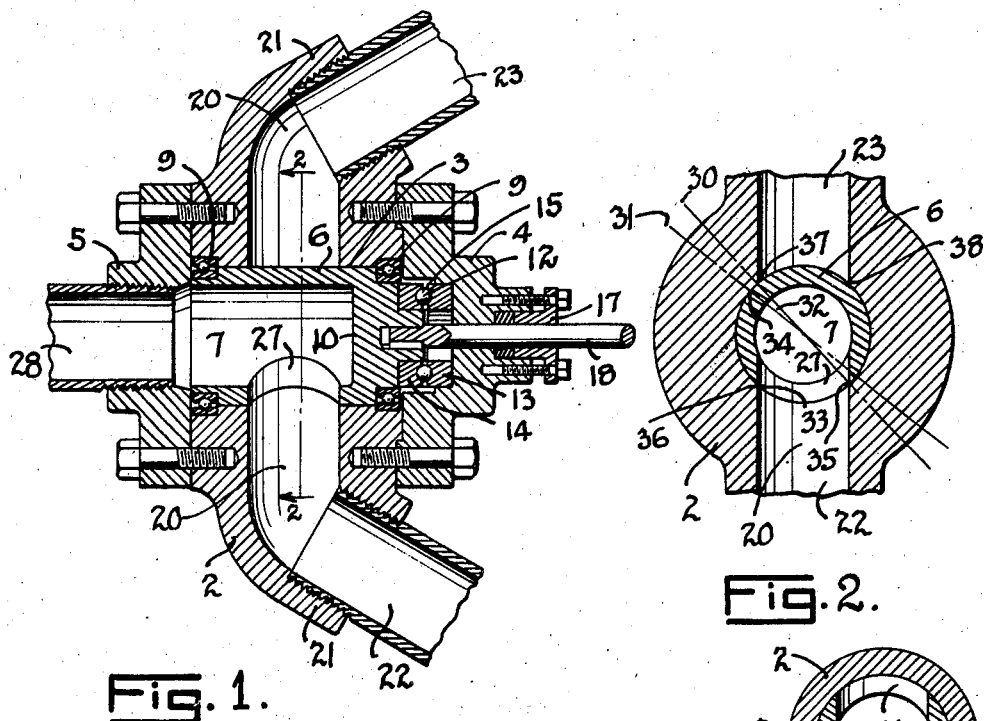
Fig. 1.
Fig. 2.
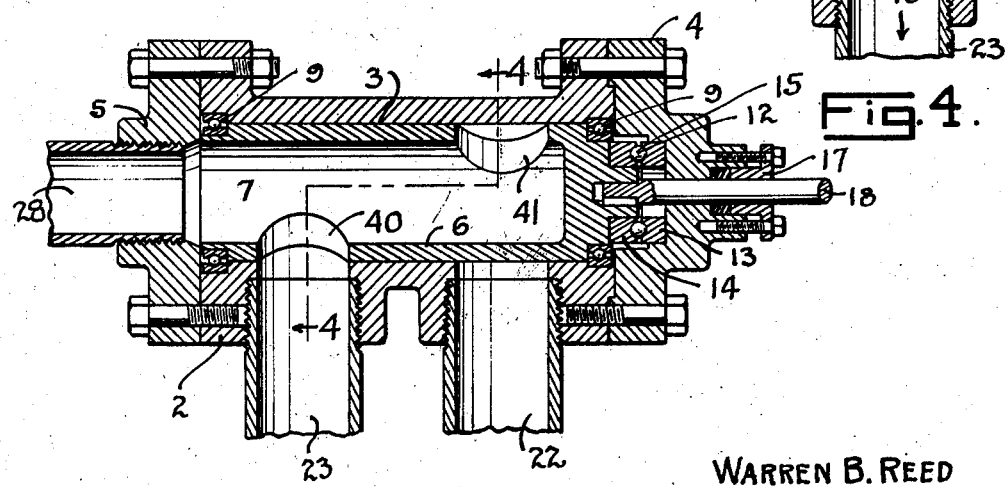
Fig. 4.
Fig. 3.
WARREN B. REED
INVENTOR.
BY Lester B. Clark.
ATTORNEY.

Patented May 18, 1943

2,319,347

UNITED STATES PATENT OFFICE 2,319,347

VALVE CONTROL

Warren B. Reed, New Orleans, La.

Application June 5, 1941, Serial No. 396,701

1 Claim. (Cl. 251—107)

The invention relates to a rotary valve control for pumping apparatus and is arranged to control the flow of actuating power liquid to and from the pumping cylinder.

In hydro-pneumatic pumping units the actuating liquid is provided in a pressure tank and is admitted to the pump cylinder by a valve of the type herein shown. The valve rotates at a constant speed to control the flow of power liquid as it is periodically turned on and off to admit, retain, and then discharge the actuating or power liquid in the pumping cylinder. It is intended that the valve will rotate at a constant speed and the length of the stroke will be governed by the load and pressure, whereas the timing of the stroke is controlled by the present valve.

The invention relates generally to the combination set forth in my prior copending application, Serial No. 202,440, filed April 16, 1938, now Patent No. 2,279,057, granted Apr. 7, 1942, for a Pump. The present invention relates to a particular type of valve which is used in that combination and also directed to the general substance of my companion application, Serial No. 396,699, for a Pressure control for hydro-pneumatic pumping units, which application is filed of even date herewith.

It is one of the objects of the invention to arrange and construct a rotary valve which is arranged to rotate at a constant speed in a continuous direction in order to admit and release the actuating liquid from a pump cylinder of a hydro-pneumatic pumping unit.

Another object of the invention is to provide a rotary valve for hydro-pneumatic pumping units wherein the actuating liquid is admitted as the valve opens and retained for a short period of time and then released from the cylinder, this rest or pause period being for the purpose of allowing the various parts of the equipment to come to rest before the operation of the pumping equipment is resumed.

Another object of the invention is to provide a control valve which can be operated at a constant speed and which will open and close to admit and discharge the actuating liquid in hydro-pneumatic pumping units.

Another object of the invention is to so construct and arrange the orifices and ports of a rotary control valve that the port will gradually open and gradually close to control the flow of actuating liquid.

Another object of the invention is to provide a rotary valve wherein the flow is axially of the valve member.

Another object of the invention is to provide a rotor for control valves wherein the rotor is supported by antifriction bearings both against radial and axial thrusts.

Still another object of the invention is to provide a rotary valve which is supported in position so as to maintain a seal but which will rotate with a minimum of effort.

Other and further objects of the invention will be readily apparent when the following description is considered in connection with the accompanying drawing wherein:

Fig. 1 is a transverse vertical section of a valve constructed in accordance with the invention.

Fig. 2 is a section taken on the line 2—2 of Fig. 1.

Fig. 3 shows a modified form of the device wherein the inlet and outlet connections are both on the same side of the valve.

Fig. 4 is a section taken on the line 4—4 of Fig. 3.

As pointed out in my companion application, a valve is necessary in the pumping unit assembly for the purpose of controlling the flow of actuating or power liquid. As seen in Fig. 1, the present valve includes the housing 2 which has a central opening or chamber 3 therein. This chamber preferably extends entirely through the housing 2 and may be closed at one end by a cap or head 4 and at the other end by a closure plate 5.

Disposed in the chamber 3 is the rotary valve member 6 which is in the form of a hollow cylindrical member which fits closely within the chamber 3. This valve is supported against rotational thrusts by the antifriction bearings 9, one set of which are positioned at each end of the chamber 3 and are carried by the valve so that it will rotate with a minimum of effort.

This rotor or valve is hollow at 7 so that if there is any liquid pressure therein it will be exerted against the closed head portion 10, tending to move the valve or rotor to the right, as seen in Fig. 1. To oppose this axial thrust an antifriction bearing 12 has been provided in the head 4. This bearing may include the supporting rings 13 and 14 and the ball bearings 15. Inasmuch as the principal thrust on the valve is exerted on the head 10, it seems clear that with bearings of the type herein described, that the valve will be readily rotatable.

A stuffing box 17 forms a seal about the drive shaft 18 by which the rotor is turned.

The housing 2, as seen in Fig. 1, has a lateral passage 20 extending therethrough which may be of any desired shape or configuration but will preferably lead in one direction as shown by the elbows 21. Each of these elbows is arranged to threadedly receive a conduit or pipe.

The rotor 6 has an opening 27 therein which is in the form of a circular hole drilled or otherwise formed in the periphery of the rotor. This opening 27 will be so positioned that as it rotates it will move into and out of alignment with the lower passage 22 which is preferably connected with the source of higher pressure.

The port 27 will also connect with the passage 23 at the upper end of the housing which may preferably lead to the low pressure or receiver reservoir. This construction is seen in Fig. 2 where the rotor is illustrated as being opened into the passage 22. It should be noted that the opening 27 is of such size that as the valve rotates the passage 22 will be completely closed before the opening 27 moves into alignment with the passage 23.

In operation, therefore, when the valve is moved to the position of Figs. 1 and 2, there will be a flow of pressure fluid through the passage 22, the port 27 and the chamber 7. This liquid will flow out of the end of the valve member and into the pipe or conduit 28 which leads to and from the pump cylinder. After a predetermined period the shaft 18 causes the opening 27 to move out of alignment with the opening 22 and cut off any further flow of liquid. Fig. 2 illustrates the relative timing and control of the inlet and outlet openings and the lines 30 and 31 differ from each other by the angle 32 which is the angle of rotation during which the inlet passage is completely closed. This is true because the point 33 on the leading edge of the valve port 27 will have arrived at the point 34 by the time the edge 35 of the port 27 will have arrived at the edge 36 of the opening 22. In this manner there will be a rest or pause period during which neither the inlet nor outlet will be open and the liquid which has entered will be trapped in the pump plunger. As soon as the leading edge 36, however, passes the edge 37 of the opening 23, then the liquid can begin to discharge and this discharge will continue until the edge 35 finally passes the corner 38 which will close the opening 23.

With the construction just described there will be a pause or rest period after closing and before opening of each of the outlets. This rest or pause period may be varied by changing the size of the opening of the port and the timing as to when it will move into or out of alignment with the passages 22 and 23.

Fig. 3 shows a modified form of the device wherein the parts are the same as previously described except that the rotor has been elongated and both the passages 22 and 23 are arranged on the same side of the rotor. This necessitates an additional opening 40 which will register with the discharge outlet 23, whereas the opening 41, which is the same as the port 27, will move into and out of alignment with the high pressure line 22. The general arrangement and construction of Fig. 3 is the same as that described in connection with Fig. 1, except for the positioning of the parts.

Fig. 4 shows a sectional view taken on the line 4—4 of Fig. 3 to illustrate the opposed relationship of the ports 40 and 41.

Broadly, the invention contemplates a rotary valve which will turn at a constant speed and which will fit closely enough to prevent leakage, but which will rotate with a minimum of effort in controlling the flow of actuating liquid.

What is claimed is:

In a rotating valve mechanism for hydropneumatic pumping systems where there is a reversal of flow of liquid, a housing, a hollow cylindrical rotor therein closed at one end, a cap closure for one end of said housing having a thrust bearing therein to rotatably receive said rotor, a driving shaft connected to said cylindrical rotor and extending through said bearing, a cap for the other end of said housing to retain said rotor, radial bearings in said housing to support said rotor, said cap being provided with a conductor pipe in concentric alignment with the open end of said cylindrical rotor, a port in said rotor for discharging and receiving liquid relative to said hollow rotor, and oppositely disposed inlet and outlet passages to supply and discharge pressure liquid as said port moves into and out of alignment therewith.

WARREN B. REED.